(12) United States Patent  
Westfall

(10) Patent No.: US 10,703,252 B2  
(45) Date of Patent: Jul. 7, 2020

(54) CARGO MANAGEMENT SYSTEM

(71) Applicant: FORD GLOBAL TECHNOLOGIES, LLC, Dearborn, MI (US)

(72) Inventor: Christopher Robert Westfall, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 15/899,134

(22) Filed: Feb. 19, 2018

(65) Prior Publication Data

US 2019/0255985 A1    Aug. 22, 2019

(51) Int. Cl.
| | |
|---|---|
| *B60P 7/08* | (2006.01) |
| *B65D 63/14* | (2006.01) |
| *E05B 19/00* | (2006.01) |

(52) U.S. Cl.
CPC ........... *B60P 7/0853* (2013.01); *B60P 7/0807* (2013.01); *B60P 7/0892* (2013.01); *B65D 63/14* (2013.01); *E05B 19/00* (2013.01)

(58) Field of Classification Search
CPC .. B60P 7/0807; B60P 7/0892; B65D 19/0073; B65D 2519/00024; B65D 2519/00059; B65D 2519/00104; B65D 2519/00273; B65D 2519/00293
USPC ......... 410/111, 106, 107, 94, 102, 155, 122, 410/116, 115; 248/203, 235, 238, 542, 248/499, 500
See application file for complete search history.

(56) References Cited

U.S. PATENT DOCUMENTS

| | | | |
|---|---|---|---|
| 2,532,743 A * | 12/1950 | Storch | B64D 9/00 |
| | | | 410/111 |
| 2,756,693 A | 7/1956 | Frost | |
| 5,302,064 A | 4/1994 | Davis | |
| 5,961,262 A | 10/1999 | Weber | |
| 6,065,917 A | 5/2000 | Shambeau et al. | |
| 6,105,512 A | 8/2000 | Lin | |
| 6,244,802 B1 | 6/2001 | Stanesic et al. | |
| 6,793,449 B1 * | 9/2004 | Simpson | B60P 7/0807 |
| | | | 410/100 |
| 6,918,721 B2 | 7/2005 | Venton-Walters et al. | |
| 8,807,893 B2 * | 8/2014 | Adams | B60P 7/0815 |
| | | | 410/101 |
| 8,931,986 B2 * | 1/2015 | Esser | B64D 9/003 |
| | | | 410/102 |
| 9,508,234 B2 | 11/2016 | Noe et al. | |
| 2009/0212584 A1 | 8/2009 | Hill | |

* cited by examiner

*Primary Examiner* — D Glenn Dayoan  
*Assistant Examiner* — Sunsurraye Westbrook  
(74) *Attorney, Agent, or Firm* — David Coppiellie; King & Schickli, PLLC

(57) ABSTRACT

A cargo management system includes a support, having a plurality of receivers, a key, including a tongue that may be inserted into one receiver of the plurality of receivers and a locking mechanism releasably securing the key to the support and the tongue in the receiver. A first point of a strap is captured between the tongue and the receiver and extended over the cargo to be transported. A second key is then inserted into a second receiver to secure a second point of the strap and thereby hold the cargo in position on the support.

19 Claims, 10 Drawing Sheets

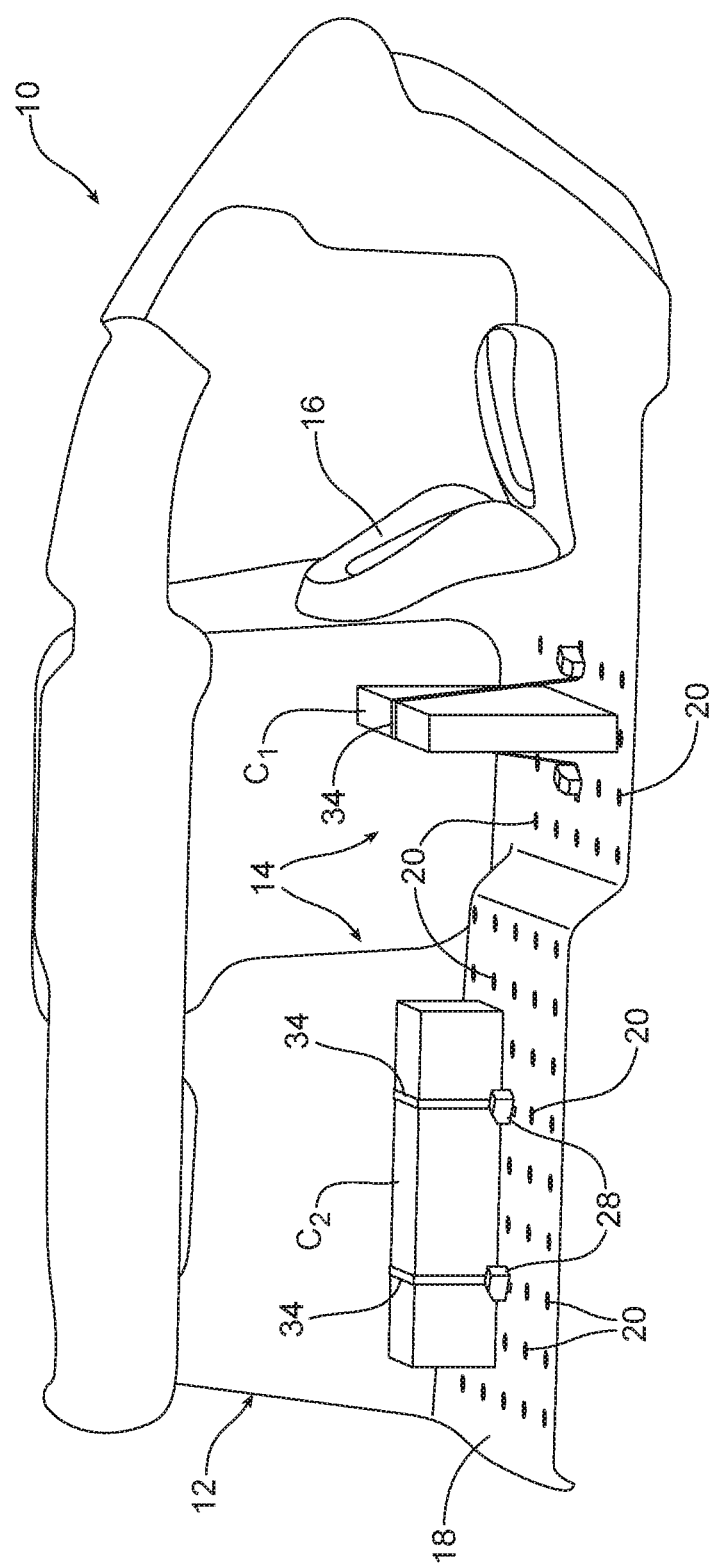

CARGO MANAGEMENT SYSTEM

TECHNICAL FIELD

This document relates generally to the vehicle equipment field and, more particularly, to a new and improved cargo management system that utilizes a support with a plurality of receivers and cooperating keys to secure straps to the support and around cargo to be transported.

BACKGROUND

When cargo and goods are carried in a motor vehicle they are subjected to acceleration, deceleration and lateral cornering forces that tend to cause the cargo to shift and potentially become damaged. Thus it is critically important to make sure that cargo being transported is securely held in place.

Toward this end, truck manufacturers commonly provide a limited number of cargo tie-down points on the cargo floor or the sidewall of the cargo area. Often these tie-down points are placed too high to ensure good downward pressure as required to retain smaller cargo items in place. In most cases, the number and position of these tie-down locations do not align to the many sizes of tools, materials and other goods that many truck users often carry.

In addition, many individuals rely upon common cargo strap systems that utilize a ratchet mechanism in order to tighten the strap down against the cargo being carried. Such a mechanism often jams as a result of the strap folding over and then running through the metal loops of the ratchet mechanism. Relieving such a jam and properly securing the strap with a ratchet mechanism can be very annoying and time consuming for the operator.

This document relates to a new and improved cargo management system that relies upon straps to tie down cargo in a quick and efficient manner without the need for a strap ratchet mechanism. As such, the present cargo management system represents a significant advance in the art.

SUMMARY

In accordance with the purposes and benefits described herein, a new and improved cargo management system is provided. That cargo management system comprises a support, including a plurality of receivers, a key, including a tongue that may be inserted into one receiver of the plurality of receivers, and a locking mechanism releasably securing the key to the support and the tongue in the one receiver.

The cargo management system may further include a strap. The strap is captured between the tongue and the one receiver. The key may include a handle. The tongue many be pivotally mounted to the handle on a pin.

The locking mechanism may include at least one latch pin carried on the handle and at least one keyhole receiver carried on the support. The latch pin may include a shank and a head wherein the head is received and captured in the keyhole receiver.

Still further, the receiver may include a cross-shaped well. The tongue may include a plurality of teeth to engage and hold the strap when the strap is captured between the tongue and the receiver within the well.

The support may comprise a mat that may be installed in various motor vehicles as needed. In another possible embodiment the support may be a load floor of a particular motor vehicle.

In accordance with another aspect, a method is provided of securing cargo in position for transport. That method comprises the steps of: positioning the cargo on a support, capturing a first point of a strap between a first key and a first receiver in the support, locking the first key in place, extending the strap across the cargo, capturing a second point of the strap between a second key and a second receiver in the support and locking the second key in position.

The method may include the step of aligning the first point of the strap over the first receiver and forcing the first point of the strap into the first receiver with a first tongue of the first key. Further, the method may include the step of rotating a first head of the first key to lock a first latch pin on the first key and a first keyhole receiver on the support. Further, the method may include engaging first teeth on the first tongue with the strap within the first receiver. Toward this end, the method may include orienting the first point of the strap over a first cross leg of the first receiver having a cross-shaped well and forcing the strap down into the first cross leg with the tongue of the first key.

In addition the method may include the step of aligning the second point of the strap over the second receiver and forcing the second point of the strap into the second receiver with a second tongue of the second key. Further, the method may include rotating a second head of the second key to lock a second latch pin on the second key and a second keyhole receiver on the support. Still further, the method may include the step of engaging second teeth on the second tongue with the strap within the second receiver.

In the following description, there are shown and described several preferred embodiments of the cargo management system as well as the related method of securing cargo in position for transport. As it should be realized, the cargo management system and related method are capable of other, different embodiments and their several details are capable of modification in various, obvious aspects all without departing from the cargo management system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo management system and the related method of securing cargo in position for transport and together with the description serve to explain certain principles thereof.

FIG. 1 is a schematic illustration of a motor vehicle equipped with the cargo management system.

Figure 2A:
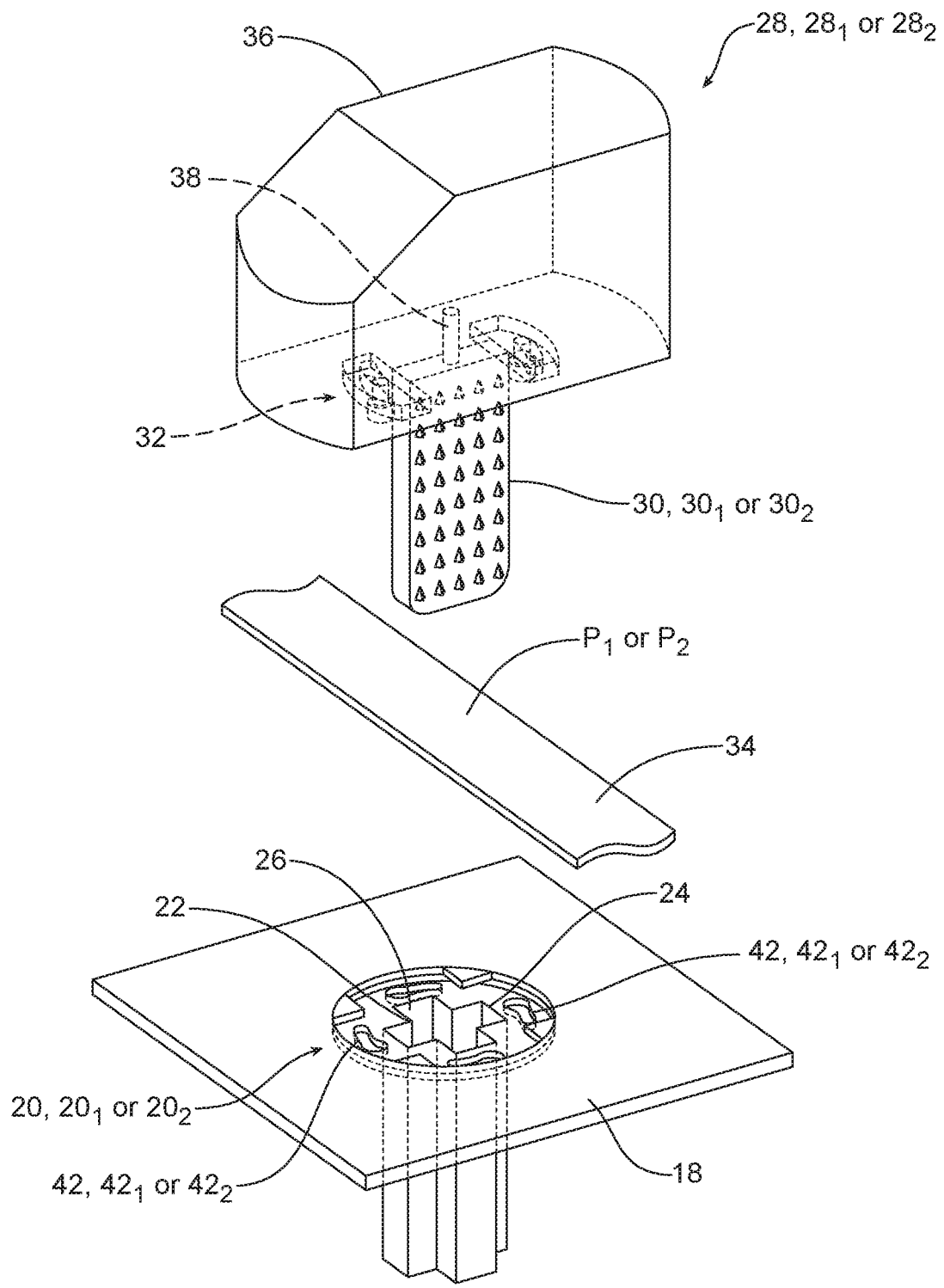
FIG. 2a is a perspective view illustrating how the key is aligned with the strap and an underlying receiver in order to lock a first point of the strap to the support.

Reference will now be made in detail to the present preferred embodiments of the cargo management system and the related method of securing cargo in position for transport, examples of which are illustrated in the accompanying drawing figures.

DETAILED DESCRIPTION

Reference is now made to FIG. 1 illustrating a motor vehicle 10 equipped with the cargo management system 12. More specifically, the motor vehicle 10 includes a cargo area 14 behind the seat 16. The cargo management system 12 includes a support 18 including a plurality of receivers 20.

As best illustrated in FIG. 2a, each receiver 20 includes a cross-shaped well 22 having a first cross leg 24 and a second cross leg 26.

The support 18 may comprise a removable mat that may be positioned in different motor vehicles as desired for the transport of cargo in a manner described in greater detail below. Alternatively, the support 18 may comprise a load floor of the motor vehicle 10.

The cargo management system 12 also includes a plurality of keys 28. Each key 28 includes a tongue 30 that may be inserted into any one of the receivers 20. A locking mechanism generally designated by reference numeral 32, releasably secures each key 28 to the support 18 and the tongue 30 of that key in the selected receiver 20.

Figure 2B:
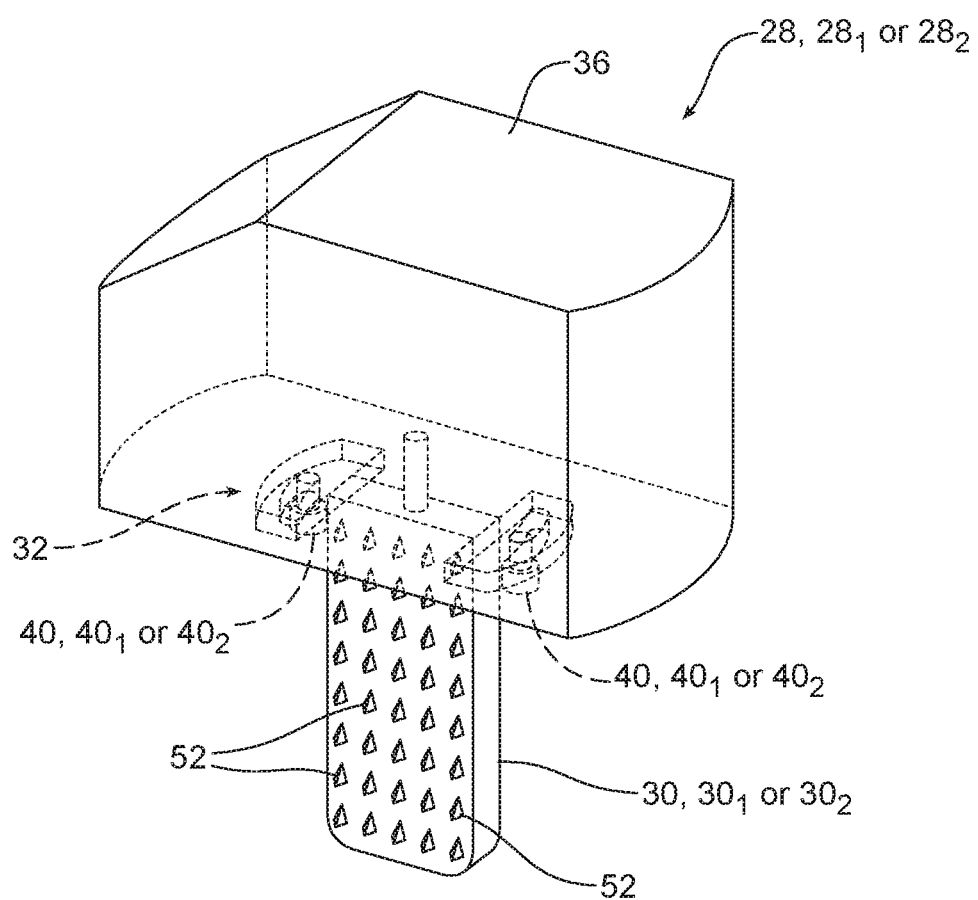
FIG. 2b is a detailed perspective view of the key.

As further illustrated in FIG. 1, the cargo management system 12 also includes a plurality of straps 34. As will be explained below, the straps 34 are captured between the tongue 30 and the outer wall of the receiver 20 in order to secure cargo $C_1$, $C_2$ in position on the support 18. More specifically, each key 28 includes a handle 36. The tongue 30 of the key 28 is pivotally mounted to the handle 36 by means of a pivot pin 38. See also FIG. 2b.

Figure 3A:
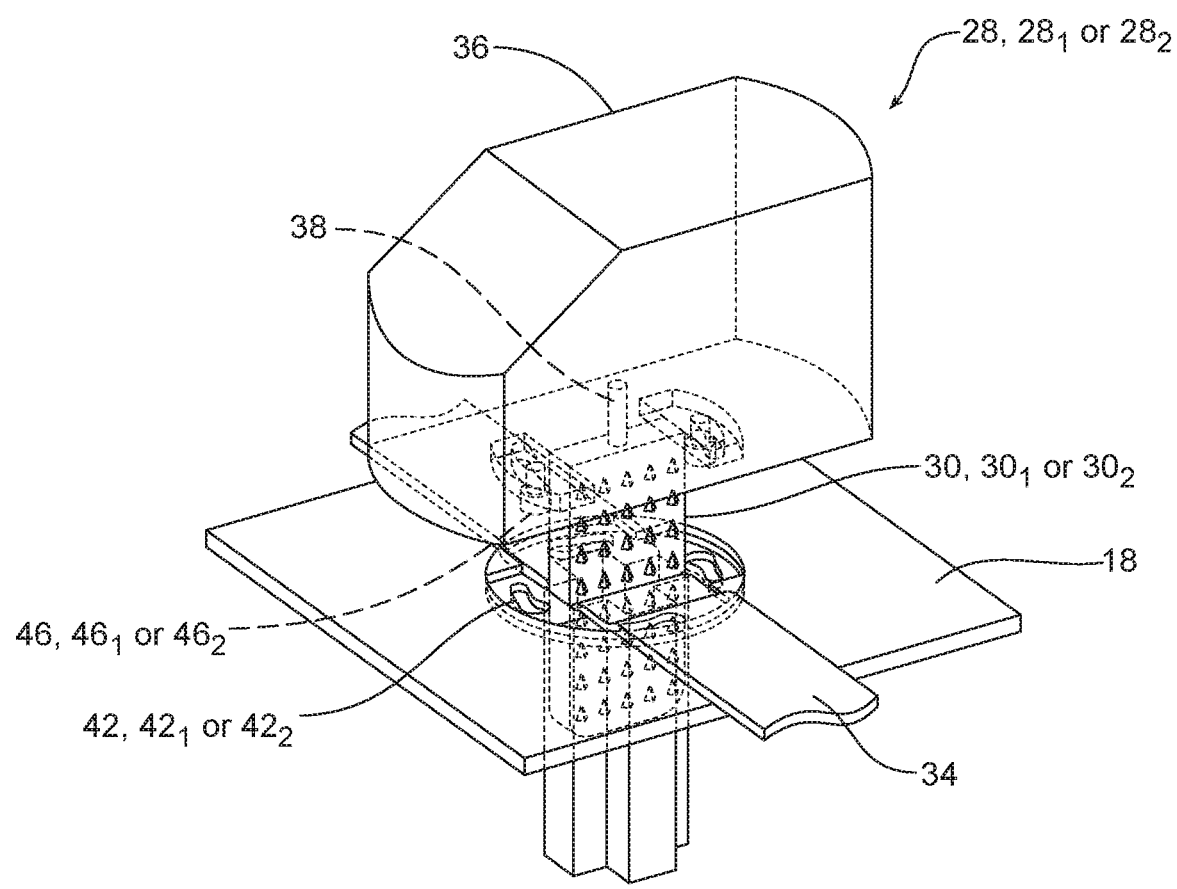
FIG. 3a is a detailed perspective view illustrating how the first point of the strap is secured in the receiver with the tongue and the first key.
Figure 3B:
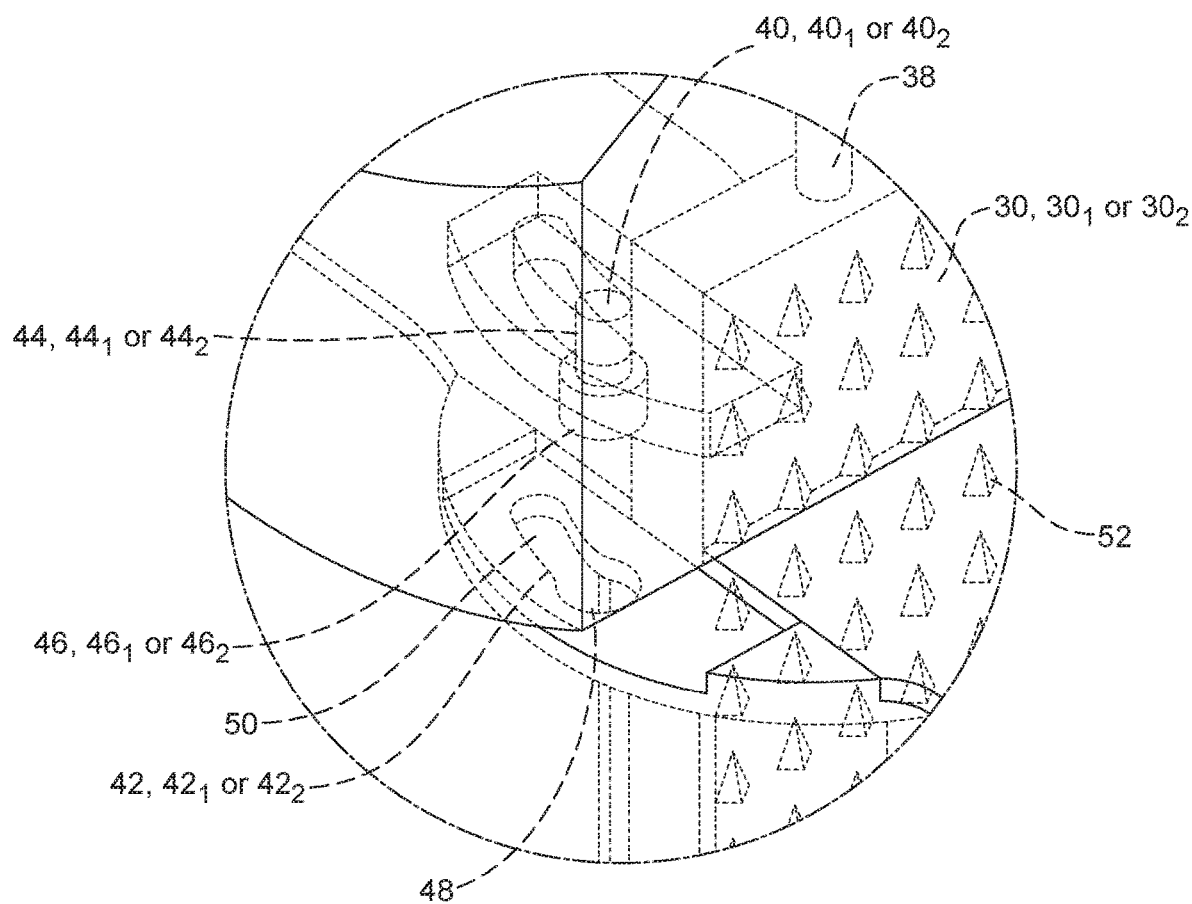
FIG. 3b is a detailed perspective view illustrating how the latch pin on the handle is aligned with the wide end of the keyhole receiver in the support when the tongue is inserted into the receiver.
Figure 4A:
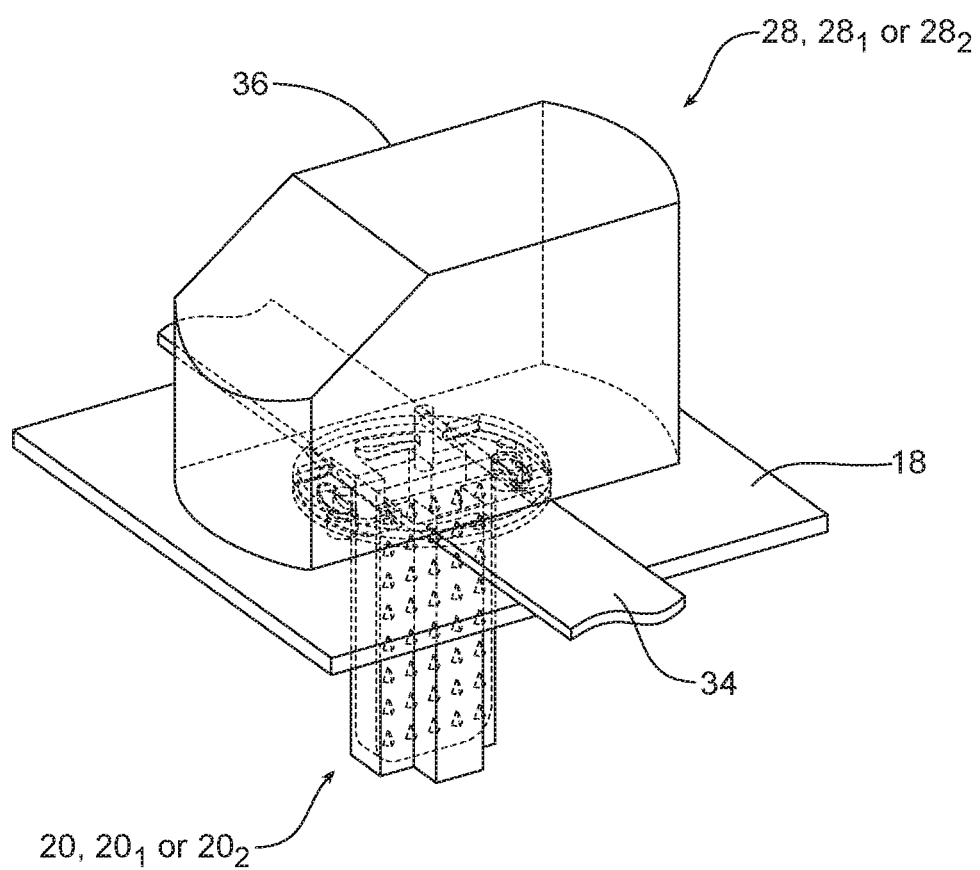
FIG. 4a is a view similar to FIG. 3a but showing the key is fully inserted in the receiver.
Figure 4B:
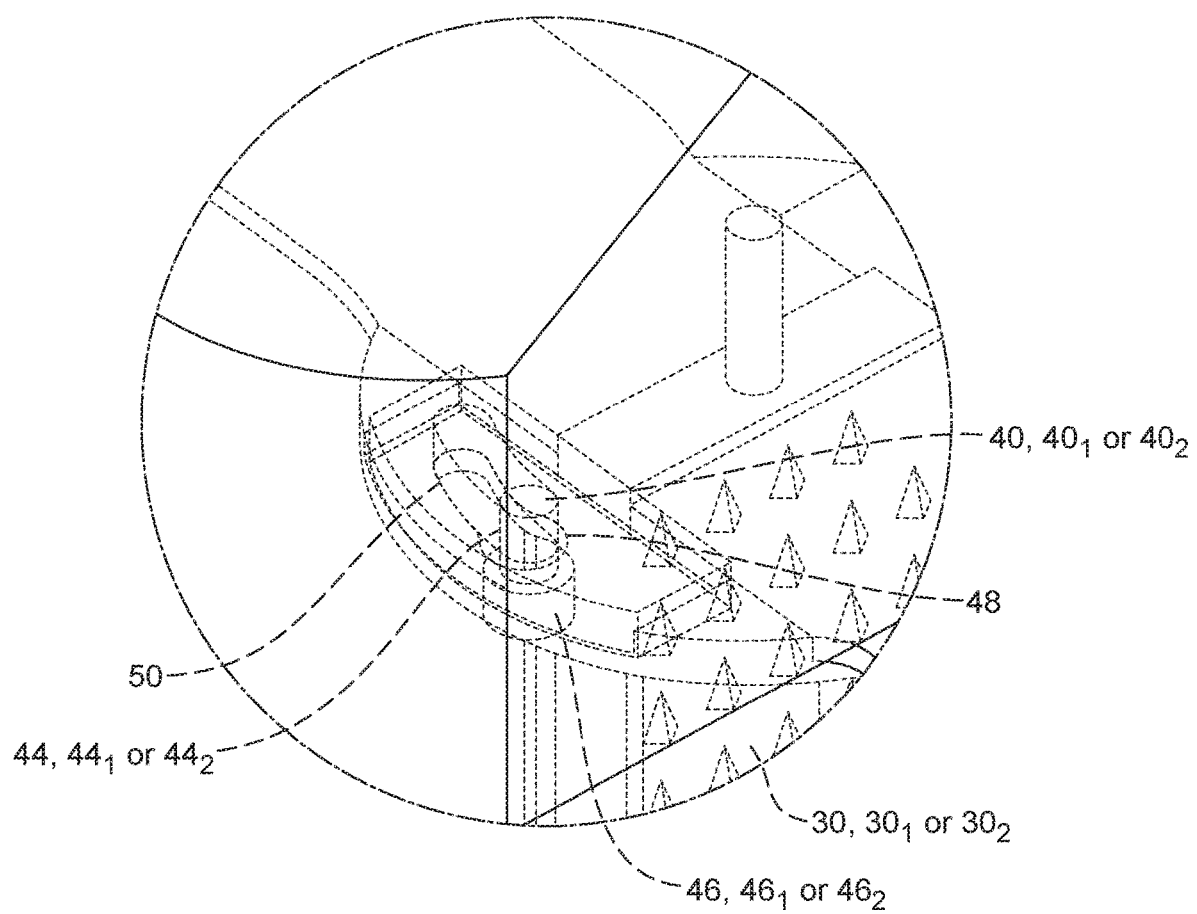
FIG. 4b is a detailed perspective view illustrating how the head of the latch pin passes through the wide end of the keyhole receiver when the key is fully inserted in the receiver of the support.
Figure 5A:
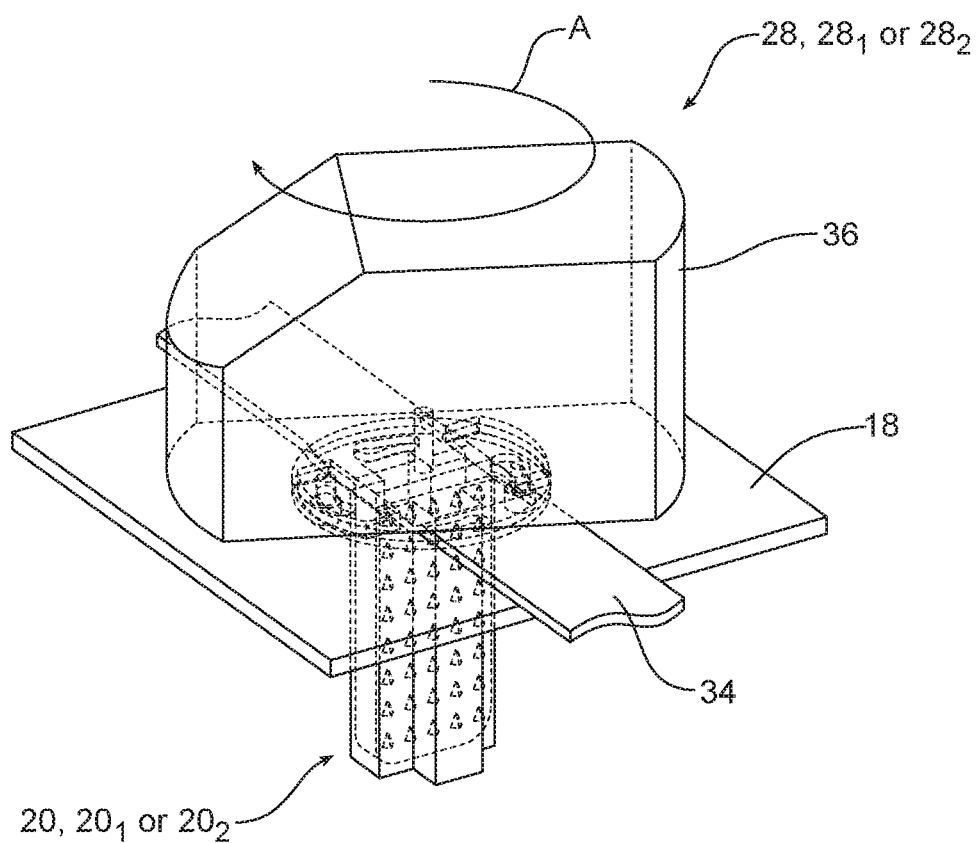
FIG. 5a illustrates how the handle is rotated to lock the key in position on the support.
Figure 5B:
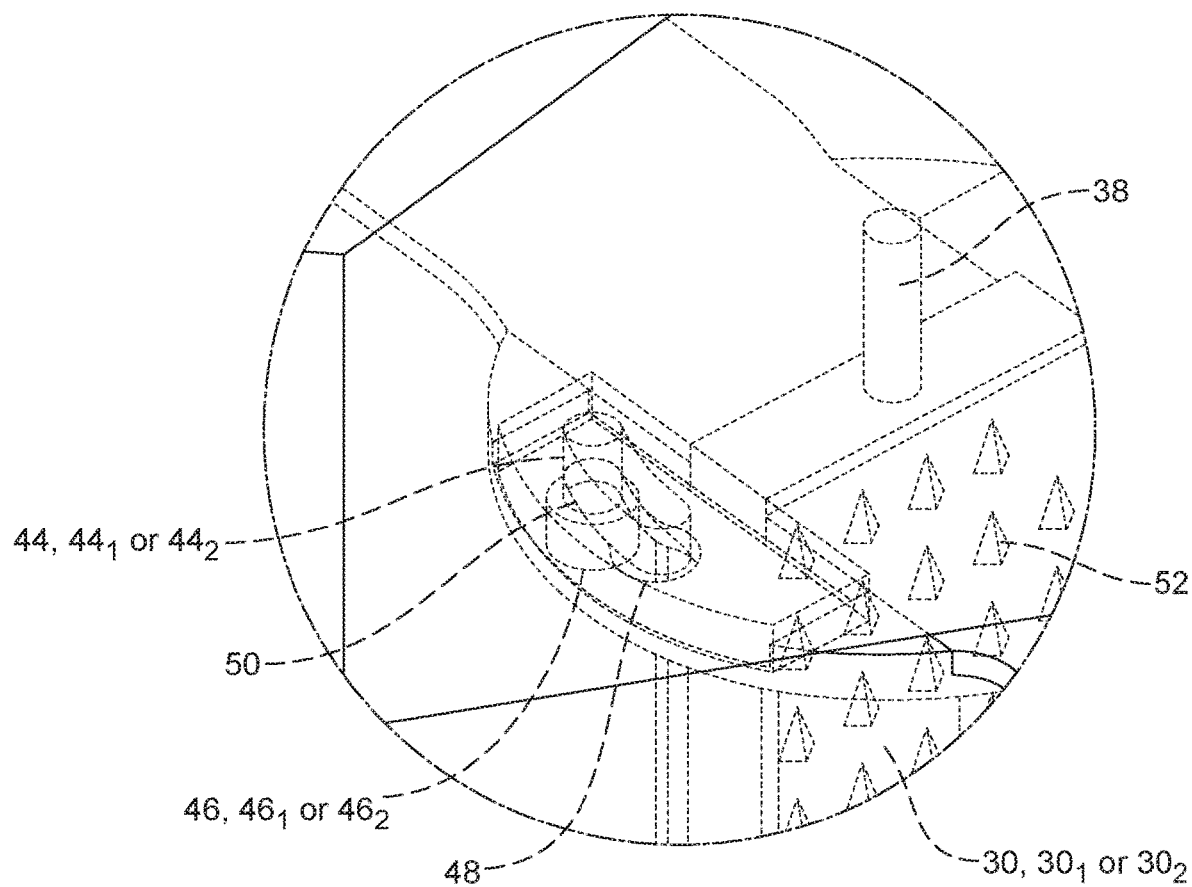
FIG. 5b is a detailed perspective view illustrating how the head of the latch pin is received and captured in the narrow end of the key-shaped receiver when the key is locked in position to the support.

The locking mechanism 32 includes at least one latch pin 40 that is carried on the handle 36 and at least one keyhole receiver 42 carried on the support 18 adjacent the well 22. As best illustrated in FIGS. 3b, 4b and 5b, each latch pin 40 includes a shank 44 and an enlarged head 46. The keyhole receiver 42 includes a large opening 48 at one end to receive the head 46 and a narrow opening 50 at the other end to receive the shank 44 and capture the head 46 when the locking mechanism 32 is locked as shown in FIG. 5b.

As should also be appreciated, each tongue 30 includes a plurality of teeth 52 to engage and hold the straps 34 captured between the tongue 30 of the key 28 and the walls of the receiver 20 in the support 18. These teeth 52 prevent the strap 34 from slipping thereby providing added security to hold the cargo $C_1$ and $C_2$ in position on the support 18 within the cargo area 14 of the motor vehicle 10.

Figure 6:
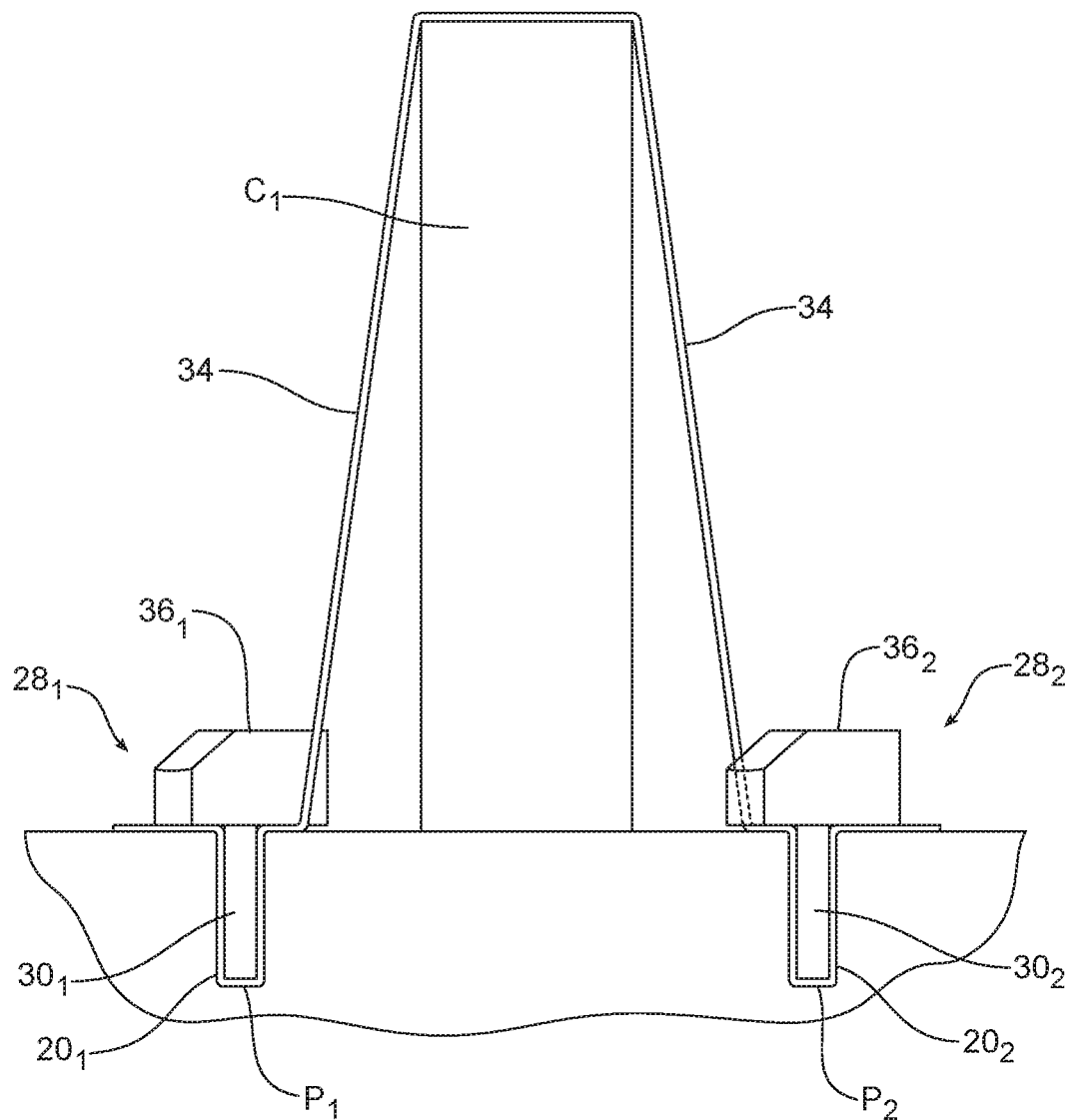
FIG. 6 is a detailed schematical view of how a strap is wrapped around cargo and secured in position to hold that cargo in place on the support.

As will be apparent from the following description, the cargo management system 12 may be used in a new and improved method of securing cargo $C_1$, $C_2$ in position for transport within the motor vehicle 10. That method includes the steps of positioning the cargo $C_1$ on the support 18, capturing a first point $P_1$ of the strap 34 between a first key $28_1$ in a first receiver $20_1$ in the support 18 and then locking the first key $28_1$ in place in the first receiver $20_1$ on the support 18. See FIG. 6.

The method also includes the steps of extending the strap 34 across the cargo $C_1$, capturing a second point $P_2$ of the strap 34 between a second key $28_2$ and a second receiver $20_2$ in the support 18 and locking the second key in position within the second receiver. The first key $28_1$ and the second key $28_2$ are secured and locked in position in the same manner as the key 28 described above and illustrated in FIGS. 2a, 2b, 3a, 3b, 4a, 4b, 5a and 5b.

More specifically, as illustrated in FIG. 2a, the method may include the step of aligning the first point $P_1$ of the strap 34 over the first receiver $20_1$ and forcing the first point of the strap into the first receiver with a first tongue $30_1$ of the first key $28_1$. Thus, as illustrated in FIG. 3a, the tongue $30_1$ is engaged at point $P_1$ of the strap 34 and inserted downward into the first cross leg $24_1$ of the well $20_1$ with the handle $36_1$ in position with respect to the tongue to align the first head $46_1$ of the latch pin $40_1$ with the enlarged opening 48 of the keyhole receiver 42. See particularly 3b. Note here that two cooperating latch pins 40 and two cooperating keyhole receivers 42 are illustrated. The locking mechanism 32 may include one, two, three or more cooperating latch pins and keyhole receivers as desired.

As the tongue $30_1$ is fully seated within the well 22 of the receiver $20_1$, the strap 34 is forced into engagement with the tongue by the sidewalls of the receiver with the teeth 52 on the tongue engaging the strap and preventing the strap from slipping.

When the first key $28_1$ is fully seated in the first receiver $20_1$, the head 46 of the latch pin $40_1$ passes through the enlarged opening 48. See FIGS. 4a and 4b. The operator then locks the locking mechanism 32 by rotating the head $46_1$ clockwise (see action arrow A and FIG. 5a). This causes the shank $44_1$ of the latch pin $40_1$ to pass into the narrow opening 50 of the keyhole receiver $42_1$ thereby capturing the enlarged head $46_1$ below the lock plate 54 and thereby securing the key in position in the receiver on the support.

Once the first point $P_1$ of the strap 34 is locked in position, the strap is extended across the cargo $C_1$ and the second point $P_2$ of the strap is aligned over the second receiver $20_2$. The second point $P_2$ of the strap 34 is then forced into the second receiver $20_2$ with the second tongue $30_2$ of the second key $28_2$. Toward this end the second head $46_2$ of the second key is rotated in the manner of the first head as described above in order to lock the second latch pin $40_2$ of the second key $28_2$ in the second keyhole receiver $20_2$ of the support 18. As this is done the second set of teeth 52 on the second tongue $30_2$ engage with the strap 34 and hold the second point of the strap in the second receiver $20_2$ in a manner that resists slipping. In this way, the strap 34 may be tightly secured across the cargo $C_1$ between the first key $28_1$ and the second key $28_2$ secured and locked to the underlying support 18. The handle $36_2$ is then twisted to lock the second key $28_2$ in the second receiver $20_2$ by means of the second latch pins $40_2$ engaging in the second keyhole receivers $42_2$.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cargo management system, comprising:
   a support including a plurality of receivers;
   a key including a tongue that is inserted into one receiver of said plurality of receivers;
   a locking mechanism releasably securing said key to said support and said tongue in said one receiver; and
   a strap, said strap being captured between said tongue and said one receiver.

2. The cargo management system of claim 1, wherein said key includes a handle.

3. The cargo management system of claim 2, wherein said tongue is pivotally mounted to said handle on a pin.

4. The cargo management system of claim 3, wherein said locking mechanism includes at least one latch pin carried on said handle and at least one keyhole receiver carried on said support.

5. The cargo management system of claim 4, wherein said latch pin includes a shank and a head wherein said head is received and captured in said keyhole receiver.

6. The cargo management system of claim 5, wherein said one receiver includes a cross-shaped well.

7. The cargo management system of claim 6, wherein said tongue includes a plurality of teeth to engage and hold said strap when said strap is captured between said tongue and said receiver.

8. The cargo management system of claim 3, wherein said one receiver includes a cross-shaped well.

9. The cargo management system of claim 8, wherein said tongue includes a plurality of teeth to engage and hold said strap when said strap is captured between said tongue and said one receiver.

10. The cargo management system of claim 1, wherein said support is a mat.

11. The cargo management system of claim 1, wherein said support is a load floor of a motor vehicle.

12. A method of securing cargo in position for transport, comprising:
    positioning said cargo on a support;
    capturing a first point of a strap between a first key and a first receiver in said support;
    locking said first key in place;
    extending said strap across said cargo;
    capturing a second point of said strap between a second key and a second receiver in said support; and
    locking said second key in position.

13. The method of claim 12 including aligning said first point of said strap over said first receiver and forcing said first point of said strap into said first receiver with a first tongue of said first key.

14. The method of claim 13, including rotating a first head of said first key to lock a first latch pin on said first key in a first keyhole receiver on said support.

15. The method of claim 14, including engaging first teeth on said first tongue with said strap in said first receiver.

16. The method of claim 15, including aligning said second point of said strap over said second receiver and forcing said second point of said strap into said second receiver with a second tongue of said second key.

17. The method of claim 16, including rotating a second head of said second key to lock a second latch pin on said second key in a second keyhole receiver on said support.

18. The method of claim 17, including engaging second teeth on said second tongue with said strap in said second receiver.

19. The method of claim 13, including orienting said first point of said strap over a first cross leg of said first receiver having a cross-shaped well and forcing said strap down into said first cross leg with said first tongue of said first key.

* * * * *